United States Patent
Holub et al.

(10) Patent No.: US 9,946,235 B2
(45) Date of Patent: Apr. 17, 2018

(54) SCHEDULING OPERATION OF GROUPS OF RESIDENTIAL DEVICES

(71) Applicant: Honeywell International Inc., Morristown, NJ (US)

(72) Inventors: Ondrej Holub, Prague (CZ); Marek Sikora, Trinec (CZ)

(73) Assignee: Honeywell International Inc., Morris Plains, NJ (US)

( * ) Notice: Subject to any disclaimer, the term of this patent is extended or adjusted under 35 U.S.C. 154(b) by 1082 days.

(21) Appl. No.: 13/960,619

(22) Filed: Aug. 6, 2013

(65) Prior Publication Data

US 2015/0045975 A1 Feb. 12, 2015

(51) Int. Cl.
| G05B 15/02 | (2006.01) |
| G06Q 10/06 | (2012.01) |
| G06Q 10/04 | (2012.01) |
| G06Q 50/06 | (2012.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl.
CPC .......... *G05B 15/02* (2013.01); *G06Q 10/04* (2013.01); *G06Q 10/0631* (2013.01); *G05B 2219/2614* (2013.01); *G05B 2219/2642* (2013.01); *G06Q 50/06* (2013.01)

(58) Field of Classification Search
None
See application file for complete search history.

(56) References Cited

U.S. PATENT DOCUMENTS

| 2009/0195349 A1* | 8/2009 | Frader-Thompson . G01D 4/002 340/3.1 |
| 2011/0231320 A1* | 9/2011 | Irving ............... G06Q 30/00 705/80 |
| 2012/0053739 A1 | 3/2012 | Brian et al. |

(Continued)

FOREIGN PATENT DOCUMENTS

| WO | 2011161476 | 12/2011 |
| WO | 2012129675 | 10/2012 |

OTHER PUBLICATIONS

Examination Report from related European Patent Application No. 14178091.6, dated Aug. 22, 2016, 7 pp.

(Continued)

*Primary Examiner* — Eric C Wai
(74) *Attorney, Agent, or Firm* — Brooks, Cameron & Huebsch, PLLC

(57) ABSTRACT

Methods and devices for scheduling operation of residential energy consumption devices are described herein. One device includes a memory and a processor. The processor can be configured to execute executable instructions stored in the memory to form a number of chains of residential energy consumption devices, wherein each of the number of chains includes different devices, determine which of the number of chains has a largest total energy consumption over a particular period of time, and determine, for the devices in the chain having the largest total energy consumption over the particular period of timed of time, an operational schedule having a lowest possible cost.

17 Claims, 3 Drawing Sheets

(56) References Cited

U.S. PATENT DOCUMENTS

2012/0078427 A1* 3/2012 Jang .................. H02J 3/14
                                                                                700/291
2012/0323393 A1   12/2012 Imhof et al.
2013/0151012 A1    6/2013 Shetty et al.

OTHER PUBLICATIONS

EP Search Report related to EP Application 14178091.6, dated Apr. 8, 2015 (7 pages).
Summons to Attend Oral Proceedings from related European Patent Application No. 14178091.6, dated May 9, 2017, 9 pp.

* cited by examiner

SCHEDULING OPERATION OF GROUPS OF RESIDENTIAL DEVICES

TECHNICAL FIELD

The present disclosure relates to methods and devices for scheduling operation of residential energy consumption devices.

BACKGROUND

Residences (e.g., houses and/or apartments) typically include a number of energy consumption devices such as, for instance, appliances (e.g., washing machines, clothes dryers, dishwashers, etc.), among other examples. Residences may also include a number of energy generators, such as, for instance, photovoltaic panels, wind turbines, etc., among other examples. These energy generating devices can be used to cover fully or partially the energy demand from the energy consumption devices.

Scheduling the operation (e.g., adjusting and/or delaying the start times) of residential energy consumption devices can reduce the energy (e.g., electricity) costs of a residence. Scheduling the operation of such residential energy consumption devices, however, can be difficult, complex, and/or time consuming due to the large number of such devices typically included in a residence and/or the length of the horizon time for which the operation of the devices may need to be scheduled. As such, previous approaches for scheduling the operation of residential energy consumption devices may be costly, time consuming, and/or use a large amount of computational resources. For instance, the time and/or computational resources needed by previous approaches to schedule the operation of residential energy consumption devices may increase exponentially with the number of the devices.

DETAILED DESCRIPTION

Figure 1:
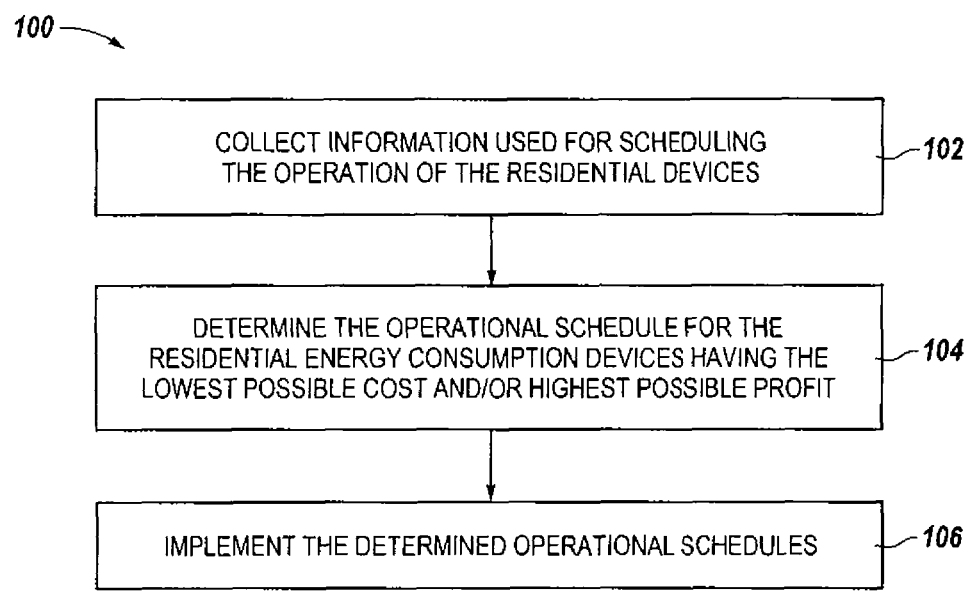
FIG. 1 illustrates a method for scheduling operation of residential energy consumption devices in accordance with one or more embodiments of the present disclosure.

Methods and devices for scheduling operation of residential energy consumption devices are described herein. For example, one or more embodiments include a memory and a processor. The processor can be configured to execute executable instructions stored in the memory to form a number of chains of residential energy consumption devices, wherein each of the number of chains includes different devices, determine which of the number of chains has a largest total energy consumption over a particular period of time, and determine, for the devices in the chain having the largest total energy consumption over the particular period of time, an operational schedule having a lowest possible cost.

Scheduling the operation of residential energy consumption devices in accordance with the present disclosure may be less costly, less time consuming, and/or use less computational resources than previous approaches. For instance, the time and/or computational resources needed to schedule the operation of residential energy consumption devices in accordance with the present disclosure may increase linearly, rather than exponentially, with the number of the devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced by 204 in FIG. 2.

As used herein, "a" or "a number of" something can refer to one or more such things. For example, "a number of chains" can refer to one or more chains.

FIG. 1 illustrates a method 100 for scheduling operation of residential energy consumption devices in accordance with one or more embodiments of the present disclosure. Scheduling the operation of the residential energy consumption devices can include, for example, adjusting and/or delaying the start times of the devices. Method 100 can be performed by a computing device, such as, for instance, computing device 330 further described herein (e.g., in connection with FIG. 3).

Residential devices, as used herein, can include residential devices that can consume and/or generate energy. For example, the residential devices can include energy consumption devices such as, for instance, appliances (e.g., washing machines, clothes dryers, dishwashers, etc.). As an additional example, the residential devices may also include energy generators such as, for instance, photovoltaic generators (e.g., panels), wind generators (e.g., turbines), etc. These energy generating devices can be used to cover fully or partially the energy demand from the energy consumption devices.

In some embodiments, the residential devices may be the devices of a single (e.g., one) residence, such as, for instance, a house. In such embodiments, the computing device may be part of a home energy management (HEM) system of the house. In some embodiments, the residential devices may be the devices of a plurality of residences, such as, for instance, apartments in an apartment building. In such embodiments, the computing device may be part of an energy management system of the apartment building.

In some embodiments, the computing device may be part of an energy management system running in the cloud. In such embodiments, the computing device can collect information (e.g., data) via the cloud and control the residential devices remotely via the cloud. The computing device can serve individual residences independently (e.g., each residence separately from the rest) via the cloud or a plurality of residences (e.g., apartments in an apartment building) together via the cloud.

At block 102, method 100 includes collecting information used for scheduling the operation of the residential devices. The information can include for example, a time frame (e.g., schedule preferences) for the operation of the devices. In some embodiments, the time frame can be determined (e.g., extracted) from the energy consumption profile associated with the devices. In some embodiments, the time frame can be received from (e.g., input and/or specified by) the user of the computing device (e.g., the resident(s) of the house or apartment(s)).

The time frame for the operation of a device can include, for example, the amount of time it takes to complete the operation of the device, the time(s) of day during which the device may operate, the number of times the device may operate (e.g., the number of cycles the device may complete), and/or the interval(s) at which the device may operate. As an example, the user may specify that a washing machine takes two hours to run, and that the washing machine is to run once a day at any time from 8:00 AM to 11:00 PM. As an additional example, the user may specify that a dishwasher takes two hours to run, and is to run once a day at any time from either 7:00 AM to 11:00 AM or 7:00 PM to 11:00 PM. As an additional example, the user may specify that a dishwasher is to run three times a day on weekends, with one hour between cycles (e.g., to unload and reload the dishwasher).

In some embodiments, the time frame for the operation of a device can be defined with respect to the time frame for the operation of another device. As an example, the user may want a clothes dryer to start only after clothes were washed in a washing machine, but not too long after the clothes were washed in the washing machine. Accordingly, in such a case, the user may specify that the clothes dryer is to begin to run within two hours of the completion of a cycle by the washing machine. Such devices can be referred to herein as natural devices, and can form natural device chains, as will be further described herein.

The information used for scheduling the operation of the residential devices may further include an energy (e.g., electricity) tariff (e.g., an energy consumption and/or generation tariff) for the location of the residence(s). In some embodiments, the tariff can be received from the user, and in some embodiments, the tariff can be received from the electricity provider for the residence(s).

The information used for scheduling the operation of the residential energy consumption devices may further include a weather (e.g., temperature, humidity, wind, etc.) forecast for the location of the residence(s). The different types of information used for scheduling the operation of the residential energy consumption devices (e.g., the time frame for the operation of the devices, the energy tariff, and the weather forecast) may be collected independently (e.g., in parallel).

At block 104, method 100 includes determining the operational schedule for the residential energy consumption devices having the lowest possible cost and/or highest possible profit. Block 104 will be further described herein (e.g., in connection with FIG. 2).

At block 106, method 100 includes implementing the determined operational schedules. Implementing the determined operational schedules can include, for example, operating the residential energy consumption devices according to the determined schedules. For example, in some embodiments, the computing device can automatically (e.g., without user input or instruction to do so) implement the determined operational schedules (e.g., automatically operate the devices according to the determined schedules).

In some embodiments, however, the determined operational schedules may not be automatically implemented. Rather, in such embodiments, the computing device may provide (e.g., display) the determined operational schedules to the user. The user may view the determined operational schedules, and elect (e.g., provide instructions to the computing device) to implement all, some, or none of the schedules.

Figure 2:
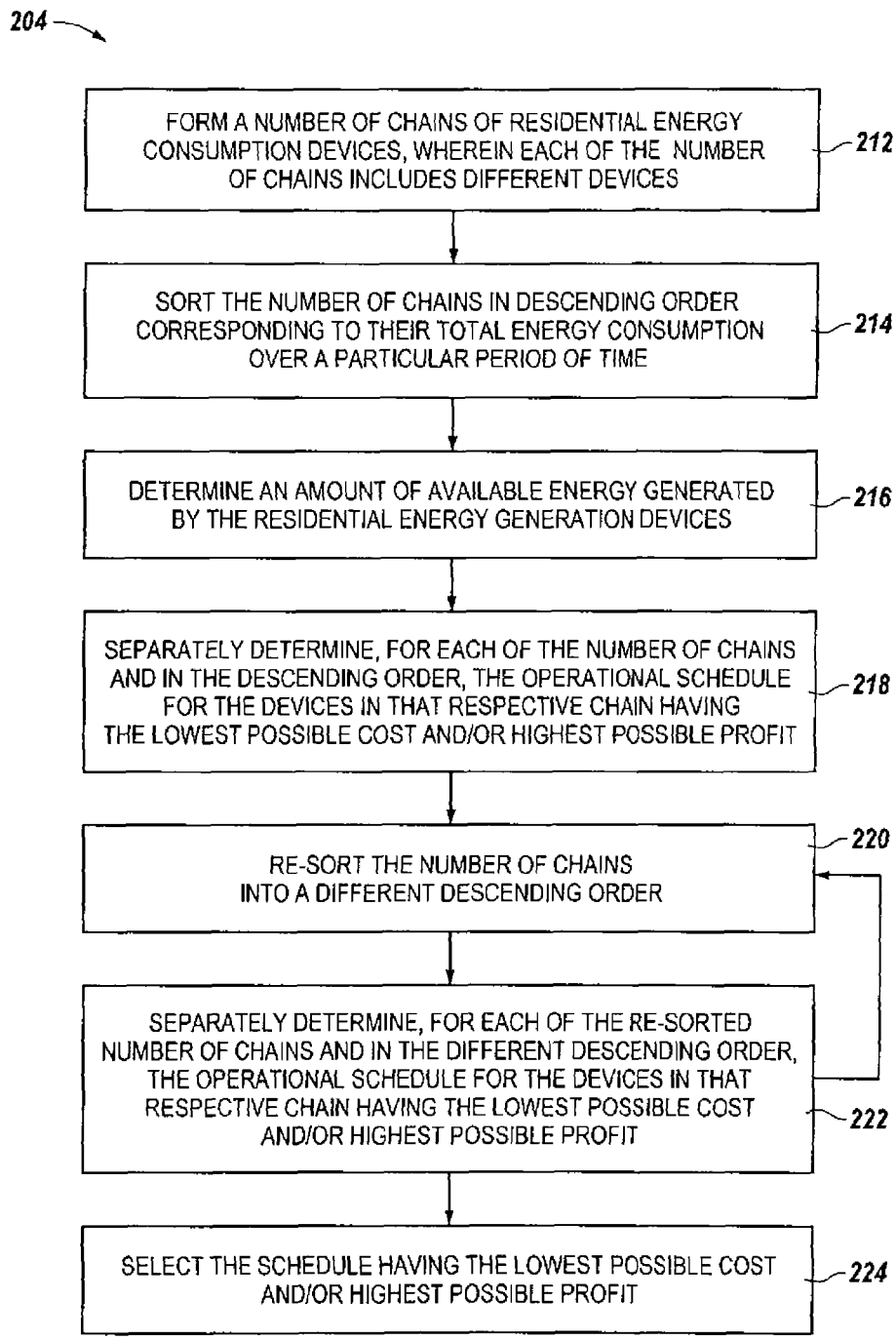
FIG. 2 illustrates a method for determining the operational schedule for residential energy consumption devices having the lowest possible cost in accordance with one or more embodiments of the present disclosure.

FIG. 2 illustrates a method 204 for determining the operational schedule for residential energy consumption devices having the lowest possible cost in accordance with one or more embodiments of the present disclosure. In some embodiments (e.g., embodiments in which the residential devices include devices that can generate energy), method 204 may be used to determine the operational schedule for the devices having the highest possible profit. Method 204 can correspond to block 104 of method 100 previously described in connection with FIG. 1, and can be performed by a computing device, such as, for instance, the same computing device used to perform method 100 (e.g., computing device 330 further described herein).

At block 212, method 204 includes forming a number of chains of residential energy consumption devices, wherein each of the number of chains includes different devices. The devices may be the devices of a single residence or a plurality of residences, as previously described herein (e.g., in connection with FIG. 1). In some embodiments, each of the number of chains may include two or three devices. However, embodiments of the present disclosure are not limited to a particular number(s) of devices per chain.

At least one of the number of chains may include devices whose operations are dependent on (e.g., related to, defined with respect to, and/or in sequence with) each other. Such devices may be referred to herein as natural devices, and the chain(s) that includes such devices may be referred to herein as natural device chains. As an example, a natural device chain may include the washing machine and clothes dryer of a residence, because the time frame for the operation of the clothes dryer may be defined with respect to the time frame for the operation of the washing machine, as previously described herein (e.g., in connection with FIG. 1).

At least one of the number of chains may include devices whose operations are independent of (e.g., not dependent on) each other. Such chain(s) may be referred to herein as virtual device chains. The virtual device chain(s) may include, for instance, the remaining devices that are not included in any of the natural device chains. That is, if a device is not grouped in a natural device chain (e.g., the device's operation is not dependent on the operations of any other device), then the device may be grouped in a virtual device chain (e.g., the virtual device chain(s) may be formed after the natural device chain(s) are formed). Continuing the previous example, the dishwasher of the residence may be included in a virtual device chain, because its operation is not dependent on the operations of the washing machine or clothes dryer of the residence.

In some embodiments, the virtual device chains may be formed based on the total energy consumption of the devices not included in any of the natural device chains. For example, the devices having the largest total energy consumption may be grouped together in a first virtual chain, the devices having the next largest total energy consumption may be grouped together in a second virtual chain, etc.

At block 214, method 204 includes sorting the number of chains in descending order corresponding to their total energy consumption (e.g., from largest to smallest total energy consumption) over a particular period of time. That is, method 204 can include at block 214 determining which of the number of chains has the largest total energy consumption over the particular period of time, determining which of the number of chains has the next (e.g., second) largest total energy consumption over that period of time, and so on, down to the chain with the smallest total energy consumption over that period of time. The total energy consumption of a chain over a particular period of time can be, for instance, the sum of the total energy consumption of each device in the chain over that period of time.

At block 216, method 204 includes determining (e.g., calculating) an amount of available energy generated by the residential energy generation devices (e.g., photovoltaic panels and/or wind turbines). The amount of available energy can be determined by, for example, subtracting the non-schedulable energy consumption by the devices from the energy (e.g., the renewable energy) generated (e.g., estimated to be generated) by the devices.

At block 218, method 204 includes separately (e.g., one by one) determining, for each of the number of chains and in the descending order, the operational schedule for the devices in that respective chain having the lowest possible cost and/or highest possible profit. That is, method 204 can include at block 218 determining, for the devices in the chain having the largest total energy consumption over the particular period of time, the operational schedule having the lowest possible cost and/or highest possible profit, then determining, for the devices in the chain having the next largest total energy consumption over that period of time, the operational schedule having the lowest possible cost and/or highest possible profit, and so on, down to determining, for the devices in the chain having the smallest total energy consumption over that period of time, the operational schedule having the lowest possible cost and/or highest possible profit.

The operational schedule for the devices in a chain having the lowest possible cost and/or highest possible profit can be determined based on (e.g., using) the information about the devices in that chain collected at block 102 of method 100. For example, the operational schedule for the devices in a chain having the lowest possible cost and/or highest possible profit can be determined within the time frame for the operation of the devices in that chain, can be determined based on the energy tariff for the location of the residence(s), and/or can be determined based on the weather forecast for the location of the residence(s).

At block 220, method 204 includes re-sorting the number of chains into a different descending order. For example, the number of chains can be re-sorted in descending order corresponding to their peak energy consumption (e.g., from largest to smallest peak energy consumption). That is, in such an example, method 204 can include at block 220 determining which of the number of chains has the largest peak energy consumption, determining which of the number of chains has the next (e.g., second) largest peak energy consumption, and so on, down to the chain with the smallest peak energy consumption. The peak energy consumption of a chain can be, for instance, the largest amount of energy consumed by the devices in the chain at any one point in time.

As an additional example, the number of chains can be re-sorted in descending order corresponding to their peak energy consumption over a particular period of time (e.g., from largest to smallest peak energy consumption over the particular period of time), such as, for instance, an hour or 15 minutes. That is, in such an example, method 204 can include at block 220 determining which of the number of chains has the largest peak energy consumption over a particular period of time, determining which of the number of chains has the next (e.g., second) largest peak energy consumption over the particular period of time, and so on, down to the chain with the smallest peak energy consumption over the particular period of time. The peak energy consumption of a chain over a particular period of time can be, for instance, the largest amount of energy consumed by the devices in the chain during that particular period of time.

At block 222, method 204 includes separately (e.g., one by one) determining, for each of the re-sorted number of chains and in the different descending order, the operational schedule for the devices in that respective chain having the lowest possible cost and/or highest possible profit. The operational schedule for the devices in a chain having the lowest possible cost and/or highest possible profit can be determined based on (e.g., using) the information about the devices in that chain collected at block 102 of method 100, as previously described in connection with block 218. Method 204 can then return to block 220 or proceed to block 224, as shown in FIG. 2.

At block 224, method 204 includes selecting, from the determined operational schedules, the operational schedule having the lowest possible cost and/or highest possible profit for implementation, and the selected schedule can be implemented as previously described herein (e.g., in connection with block 106 of FIG. 1).

Figure 3:
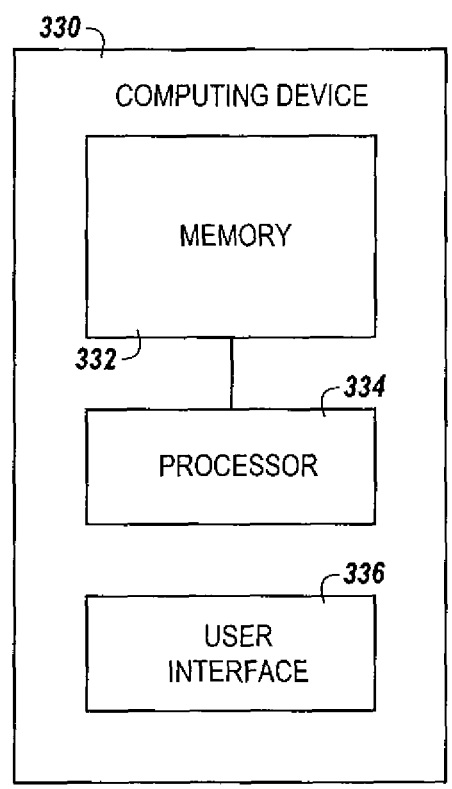
FIG. 3 illustrates a computing device for scheduling operation of residential energy consumption devices in accordance with one or more embodiments of the present disclosure.

FIG. 3 illustrates a computing device 330 for scheduling operation of residential energy consumption devices in accordance with one or more embodiments of the present disclosure. Computing device 330 can be, for example, a laptop computer, a desktop computer, or a mobile device such as, for instance, a tablet, a mobile phone, a smart phone, a personal digital assistant (PDA), a smart device, etc. However, embodiments of the present disclosure are not limited to a particular type of computing device.

In some embodiments, computing device 330 may be part of an energy management system for a single (e.g., one) residence. For example, computing device 330 may be part of a home energy management (e.g., HEM) system of a house. In some embodiments, computing device 330 may be part of an energy management system for a plurality of residences. For example, computing device 330 may be part of an energy management system for apartments in an apartment building.

In some embodiments, computing device 330 may be part of an energy management system running in the cloud. In such embodiments, computing device 330 can collect information (e.g., data) via the cloud and control the residential devices remotely via the cloud. Computing device 330 can serve individual residences independently (e.g., each residence separately from the rest) via the cloud or a plurality of residences (e.g., apartments in an apartment building) together via the cloud.

As shown in FIG. 3, computing device 330 includes a memory 332 and a processor 334 coupled to memory 332. Memory 332 can be any type of storage medium that can be accessed by processor 334 to perform various examples of the present disclosure (e.g., methods 100 and 204 previously described in connection with FIGS. 1 and 2, respectively). For example, memory 332 can be a non-transitory computer readable medium having computer readable instructions (e.g., computer program instructions) stored thereon that are executable by processor 334 to perform various examples of the present disclosure. That is, processor 334 can execute the executable instructions stored in memory 332 to perform various examples of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 332 can also be located internal to another computing resource (e.g., enabling computer readable instructions to be downloaded over the Internet or another wired or wireless connection).

As shown in FIG. 3, computing device 330 includes a user interface 336. User interface 336 can provide (e.g., display and/or present) and/or receive information (e.g., data and/or images) to and/or from a user (e.g., operator) of computing device 330. For example, user interface 336 can be a graphical user interface (GUI) that can include a display (e.g., a screen) that can provide and/or receive information to and/or from the user of computing device 330. The display can be, for instance, a touch-screen (e.g., the GUI can include touch-screen capabilities). The user can be, for example, a management level employee (e.g., executive) of a company (e.g., a financial services company).

As an example, user interface 336 can receive information for scheduling the operation of residential energy consumption devices from a user of computing device 330, as previously described herein (e.g., in connection with FIG. 1). As an additional example, user interface 336 can provide operational schedules for the devices determined by computing device 330 to the user, as previously described herein (e.g., in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for scheduling operation of residential energy consumption devices, comprising:
    a memory; and
    a processor configured to execute executable instructions stored in the memory to:
        form a number of chains of residential energy consumption devices, wherein each of the number of chains includes a plurality of different devices, and wherein:
            at least one of the number of chains includes a plurality of devices whose operations are dependent on each other, wherein the plurality of devices whose operations are dependent on each other include a device in one of the number of chains having a start time for operation that is defined with respect to an end time for operation of another device in that chain; and
            one of the number of chains includes a plurality of devices whose operations are independent of each other and have a largest energy consumption of the plurality of different devices not included in any of the chains that include the devices whose operations are dependent on each other;
        sort the number of chains in descending order corresponding to their total energy consumption over a particular period of time to determine which of the number of chains has a largest total energy consumption over a particular period of time;
        determine, for the devices in the chain having the largest total energy consumption over the particular period of time, an operational schedule having a lowest possible cost; and
        operate the devices in the chain having the largest total energy consumption over the particular period of time according to the determined operational schedule.

2. The computing device of claim 1, wherein the processor is configured to execute the instructions to:
    determine which of the number of chains has a next largest total energy consumption over the particular period of time; and
    determine, for the devices in the chain having the next largest total energy consumption over the particular period of time, an operational schedule having a lowest possible cost.

3. The computing device of claim 1, wherein the processor is configured to execute the instructions to determine, for the devices in the chain having the largest total energy consumption over the particular period of time, an operational schedule having a highest possible profit based on an energy tariff or weather forecast for a location of the devices in the chain having the largest total energy consumption over the particular period of time.

4. The computing device of claim 1, wherein the processor is configured to execute the instructions to:
   receive, from a user, a time frame for operation of the residential energy consumption devices; and
   determine, for the devices in the chain having the largest total energy consumption over the particular period of time, the operational schedule having the lowest possible cost within the time frame for the operation of the devices in the chain.

5. The computing device of claim 1, wherein the processor is configured to execute the instructions to:
   determine, from an energy consumption profile associated with the residential energy consumption devices, a time frame for operation of the devices; and
   determine, for the devices in the chain having the largest total energy consumption over the particular period of time, the operational schedule having the lowest possible cost within the time frame for the operation of the devices in the chain.

6. The computing device of claim 1, wherein the processor is configured to execute the instructions to:
   receive an energy tariff; and
   determine, for the devices in the chain having the largest total energy consumption over the particular period of time, the operational schedule having the lowest possible cost based on the energy tariff.

7. The computing device of claim 1, wherein the processor is configured to execute the instructions to:
   receive a weather forecast; and
   determine, for the devices in the chain having the largest total energy consumption over the particular period of time, the operational schedule having the lowest possible cost based on the weather forecast.

8. A computer implemented method for scheduling operation of residential energy consumption devices, comprising:
   forming a number of chains of residential energy consumption devices, wherein each of the number of chains includes a plurality of different devices, and wherein:
      at least one of the number of chains includes a plurality of devices whose operations are dependent on each other, wherein the plurality of devices whose operations are dependent on each other include a device in one of the number of chains having a start time for operation that is defined with respect to an end time for operation of another device in that chain; and
      one of the number of chains includes a plurality of devices whose operations are independent of each other and have a largest energy consumption of the plurality of different devices not included in any of the chains that include the devices whose operations are dependent on each other;
   determining which of the number of chains has a largest total energy consumption over a particular period of time by sorting the number of chains in descending order corresponding to their total energy consumption over the particular period of time;
   determining, for the devices in the chain having the largest total energy consumption over the particular period of time, an operational schedule having a lowest possible cost;
   operating the devices in the chain having the largest total energy consumption over the particular period of time according to the determined operational schedule;
   determining which of the number of chains has a next largest total energy consumption over the particular period of time;
   determining, for the devices in the chain having the next largest total energy consumption over the particular period of time, an operational schedule having a lowest possible cost; and
   operating the devices in the chain having the next largest total energy consumption over the particular period of time according to the determined operational schedule.

9. The method of claim 8, wherein the residential energy consumption devices include devices of a single residence.

10. The method of claim 8, wherein the residential energy consumption devices include devices of a plurality of residences.

11. A non-transitory computer readable medium having computer readable instructions stored thereon that are executable by a processor to:
   form a number of chains of residential energy consumption devices, wherein each of the number of chains includes a plurality of different devices, and wherein:
      at least one of the number of chains includes a plurality of devices whose operations are dependent on each other, wherein the plurality of devices whose operations are dependent on each other include a device in one of the number of chains having a start time for operation that is defined with respect to an end time for operation of another device in that chain; and
      one of the number of chains includes a plurality of devices whose operations are independent of each other and have a largest energy consumption of the plurality of different devices not included in any of the chains that include the devices whose operations are dependent on each other;
   sort the number of chains in descending order corresponding to their total energy consumption over a particular period of time;
   separately determine, for each of the number of chains and in the descending order, an operational schedule for the devices in that respective chain having a lowest possible cost; and
   operate the devices in each respective chain according to the determined operational schedule for that respective chain.

12. The computer readable medium of claim 11, wherein the instructions are executable to determine an amount of available energy generated by the residential energy generation devices.

13. The computer readable medium of claim 12, wherein the instructions are executable to update the amount of available energy based on the determined operational schedules.

14. The computer readable medium of claim 11, wherein the instructions are executable to:
   re-sort the number of chains in descending order corresponding to their peak energy consumption; and
   separately determine, for each of the re-sorted number of chains and in the descending order corresponding to their peak energy consumption, an operational schedule for the devices in that respective chain having a lowest possible cost.

15. The computer readable medium of claim 11, wherein the instructions are executable to:
   re-sort the number of chains in descending order corresponding to their peak energy consumption over a particular period of time; and
   separately determine, for each of the re-sorted number of chains and in the descending order corresponding to their peak energy consumption over the particular period of time, an operational schedule for the devices in that respective chain having a lowest possible cost.

16. The computer readable medium of claim 11, wherein the instructions are executable to automatically implement the determined operational schedules.

17. The computer readable medium of claim 11, wherein the instructions are executable to provide the determined operational schedules to a user.

* * * * *